United States Patent
Koskela et al.

(10) Patent No.: US 11,115,848 B2
(45) Date of Patent: Sep. 7, 2021

(54) APPARATUS, METHOD AND COMPUTER PROGRAM

(71) Applicant: Nokia Technologies Oy, Espoo (FI)

(72) Inventors: Timo Koskela, Oulu (FI); Sami Hakola, Kempele (FI); Esa Malkamaki, Espoo (FI); Juha Karjalainen, Oulu (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/180,273

(22) Filed: Nov. 5, 2018

(65) Prior Publication Data

US 2020/0145860 A1 May 7, 2020

(51) Int. Cl.
| | |
|---|---|
| *G06F 11/00* | (2006.01) |
| *H04W 24/10* | (2009.01) |
| *H04B 7/06* | (2006.01) |
| *H04W 76/10* | (2018.01) |

(52) U.S. Cl.
CPC .......... *H04W 24/10* (2013.01); *H04B 7/0617* (2013.01); *H04W 76/10* (2018.02)

(58) Field of Classification Search
CPC ..... H04W 24/10; H04W 76/10; H04B 7/0617
USPC ................................................. 370/252, 254
See application file for complete search history.

(56) References Cited

U.S. PATENT DOCUMENTS

| | | | | |
|---|---|---|---|---|
| 2019/0268053 | A1* | 8/2019 | John Wilson | H04W 24/10 |
| 2019/0281587 | A1* | 9/2019 | Zhang | H04L 1/00 |
| 2019/0379506 | A1* | 12/2019 | Cheng | H04W 80/02 |
| 2019/0394084 | A1* | 12/2019 | Tsai | H04L 47/27 |
| 2020/0022004 | A1* | 1/2020 | Liu | H04L 1/0038 |
| 2020/0112886 | A1* | 4/2020 | John Wilson | H04W 72/042 |
| 2020/0112974 | A1* | 4/2020 | Sun | H04B 7/0695 |
| 2020/0260358 | A1* | 8/2020 | Ratnam | H04B 7/024 |
| 2020/0266870 | A1* | 8/2020 | Yoon | H04B 7/0632 |
| 2021/0051579 | A1* | 2/2021 | Luo | H04W 76/11 |

OTHER PUBLICATIONS

3GPP TS 22.261 V16.2.0 $3^{rd}$ Generation Partnership Project; Technical Specification Group Services and System Aspects; Service Requirements for the 5GSystem; Stage 1 (Release 16) Dec. 2017.
AT&T, Qualcomm, Samsung "New SID Proposal: Study on Integrated Access and Backhaul for NR Approval" 8881123GPP TSG RAN Meeting #75 RP-170821 Dubrovnik, Croatia, Mar. 6-9, 2017.

* cited by examiner

*Primary Examiner* — Chuong T Ho
(74) *Attorney, Agent, or Firm* — Harrington & Smith

(57) ABSTRACT

An apparatus means for performing: communicating with a serving node in a wireless communication system; and storing preconfigured beam information for communication between the apparatus and one or more candidate nodes; and when the apparatus initiates a connection with a candidate node of the one or more candidate nodes, using the preconfigured beam information for at least initial communication with the candidate node; wherein the preconfigured beam information is obtained by the apparatus based on or more measurements performed by the apparatus with the one or more candidate nodes.

29 Claims, 10 Drawing Sheets

APPARATUS, METHOD AND COMPUTER PROGRAM

FIELD

This disclosure relates to a communications network. More particularly, the present disclosure relates to self-configuration of nodes in a communication network. More particularly still, the present disclosure relates to beam forming.

BACKGROUND

A communication system can be seen as a facility that enables communication between two or more devices such as user terminals, machine-like terminals, base stations and/or other nodes by providing communication channels for carrying information between the communicating devices. A communication system can be provided for example by means of a communication network and one or more compatible communication devices. The communication may comprise, for example, communication of data for carrying data for voice, electronic mail (email), text message, multimedia and/or content data communications and so on. Non-limiting examples of services provided include two-way or multi-way calls, data communication or multimedia services and access to a data network system, such as the Internet.

Since introduction of fourth generation (4G) services increasing interest has been paid to the next, or fifth generation (5G) standard. 5G may also be referred to as a New Radio (NR) network. Standardization of 5G or New Radio networks is an on-going study item.

STATEMENT OF INVENTION

According to a first aspect there is provided an apparatus comprising means for performing: communicating with a serving node in a wireless communication system; and storing preconfigured beam information for communication between the apparatus and one or more candidate nodes; and when the apparatus initiates a connection with a candidate node of the one or more candidate nodes, using the preconfigured beam information for at least initial communication with the candidate node; wherein the preconfigured beam information is obtained by the apparatus based on one or more measurements performed by the apparatus with the one or more candidate nodes.

According to an example, the one or more measurements comprise measurements of reference signals obtained from the one or more candidate nodes.

According to an example, the means are further configured to perform reporting the one or more measurements to the serving node or to the one or more candidate nodes.

According to art example, the preconfigured beam information is obtained in response to reporting the measurements by the apparatus.

According to an example, the means are further configured to establish one or more tentative connections with the one or more candidate nodes in order to obtain the preconfigured beam information.

According to an example, the means are further configured to perform beam training with the tentative connections.

According to an example, the means are further configured to perform periodical updates of the stored preconfigured beam information.

According to an example, the means are further configured to perform excluding a node as a potential candidate node based on measured signal level.

According to an example, the means are further configured to perform storing the preconfigured beam information in a table or list or information element.

According to an example, the means are further configured to perform indicating a validity of the stored preconfigured beam information by transmitting an uplink preamble that corresponds to an entry in the table or list or information element.

According to an example, the means are further configured to perform deleting the stored preconfigured beam information when it is determined that the apparatus has not performed updating of the stored preconfigured beam information for a predetermined period of time.

According to an example, the means are further configured to perform obtaining the preconfigured beam information without performing a drive test.

According to an example, the apparatus comprises an integrated access and backhaul node, or a user equipment.

According to an example, the means are further configured to perform initiating the connection with the candidate node in response to determining a blockage of the serving node.

According to an example, the means comprises at least one processor; and at least one memory and computer program code configured to, with the at least one processor, cause the performance of the apparatus.

According to a second aspect there is provided an apparatus comprising at least one processor; and at least one memory including computer program code; the at least one memory and the computer program code configured to, with the at least one processor, cause the apparatus at least to perform: communicating with a serving node in a wireless communication system; and storing preconfigured beam information for communication between the apparatus and one or more candidate nodes; and when the apparatus initiates a connection with a candidate node of the one or more candidate nodes, using the preconfigured beam information for at least initial communication with the candidate node; wherein the preconfigured beam information is obtained by the apparatus based on one or more measurements performed by the apparatus with the one or more candidate nodes.

According to an example, the one or more measurements comprise measurements of reference signals obtained from the one or more candidate nodes.

According to an example, the at least one memory and the computer program code are configured to, with the at least one processor, cause the apparatus at least to perform reporting the one or more measurements to the serving node or to the one or more candidate nodes.

According to an example, the preconfigured beam information is obtained in response to reporting the measurements by the apparatus.

According to an example, the at least one memory and the computer program code are configured to, with the at least one processor, cause the apparatus at least to perform establishing one or more tentative connections with the one or more candidate nodes in order to obtain the preconfigured beam information.

According to an example, the at least one memory and the computer program code are configured to, with the at least one processor, cause the apparatus at least to perform beam training with the tentative connections.

According to an example, the at least one memory and the computer program code are configured to, with the at least one processor, cause the apparatus at least to perform periodical updates of the stored preconfigured beam information.

According to an example, the at least one memory and the computer program code are configured to, with the at least one processor, cause the apparatus at least to perform excluding a node as a potential candidate node based on measured signal level.

According to an example, the at least one memory and the computer program code are configured to, with the at least one processor, cause the apparatus at least to perform storing the preconfigured beam information in a table or list or information element.

According to an example, the at least one memory and the computer program code are configured to, with the at least one processor, cause the apparatus at least to perform indicating a validity of the stored preconfigured beam information by transmitting an uplink preamble that corresponds to an entry in the table or list or information element.

According to an example, the at least one memory and the computer program code are configured to, with the at least one processor, cause the apparatus at least to perform deleting the stored preconfigured beam information when it is determined that the apparatus has not performed updating of the stored preconfigured beam information for a predetermined period of time.

According to an example, the at least one memory and the computer program code are configured to, with the at least one processor, cause the apparatus at least to perform obtaining the preconfigured beam information without performing a drive test.

According to an example the apparatus comprises an integrated access and backhaul node, or a user equipment.

According to an example, the at least one memory and the computer program code are configured to, with the at least one processor, cause the apparatus at least to perform initiating the connection with the candidate node in response to determining a blockage of the serving node.

According to a third example there is provided an apparatus comprising: communicating circuitry for communicating with a serving node in a wireless communication system; storing circuitry for storing preconfigured beam information for communication between the apparatus and one or more candidate nodes; and communication circuitry for, when the apparatus initiates a connection with a candidate node of the one or more candidate nodes, using the preconfigured beam information for at least initial communication with the candidate node; and measuring circuitry for performing one or more measurements with the one or more candidate nodes to obtain the one or more measurements, wherein the preconfigured beam information is based on the one or more measurements.

According to a fourth example there is provided a method comprising: communicating, by an apparatus, with a serving node in a wireless communication system; performing one or more measurements with one or more candidate nodes; storing preconfigured beam information for communication between the apparatus and the one or more candidate nodes, the preconfigured beam information based on the one or more measurements carried out by the apparatus; and when the apparatus initiates a connection with a candidate node of the one or more candidate nodes, using the preconfigured beam information for at least initial communication with the candidate node.

According to an example, the one or more measurements comprise measurements of reference signals obtained from the one or more candidate nodes.

According to an example, the method comprises reporting the one or more measurements to the serving node or to the one or more candidate nodes.

According to an example, the preconfigured beam information is obtained in response to reporting the measurements by the apparatus.

According to an example, the method comprises establishing one or more tentative connections with the one or more candidate nodes in order to obtain the preconfigured beam information.

According to an example, the method comprises performing beam training with the tentative connections.

According to an example, the method comprises performing periodical updates of the stored preconfigured beam information.

According to an example, the method comprises excluding a node as a potential candidate node based on measured signal level.

According to an example, the method comprises storing the preconfigured beam information in a table or list or information element.

According to an example, the method comprises indicating a validity of the stored preconfigured beam information by transmitting an uplink preamble that corresponds to an entry in the table or list or information element.

According to an example, the method comprises deleting the stored preconfigured beam information when it is determined that the apparatus has not performed updating of the stored preconfigured beam information for a predetermined period of time.

According to an example the method comprises obtaining the preconfigured beam information without performing a drive test.

According to an example, the apparatus comprises an integrated access and backhaul node, or a user equipment.

According to an example, the method comprises initiating the connection with the candidate node in response to determining a blockage of the serving node.

According to a fifth aspect there is provided a computer program comprising instructions for causing an apparatus to perform at least the following: communicating, by the apparatus, with a serving node in a wireless communication system; performing one or more measurements with one or more candidate nodes; storing preconfigured beam information for communication between the apparatus and the one or more candidate nodes, the preconfigured beam information based on the one or more measurements carried out by the apparatus; and when the apparatus initiates a connection with a candidate node of the one or more candidate nodes, using the preconfigured beam information for at least initial communication with the candidate node.

According to a sixth aspect there is provided a computer program comprising instructions stored thereon for performing at least the following: communicating, by an apparatus, with a serving node in a wireless communication system; performing one or more measurements with one or more candidate nodes; storing preconfigured beam information for communication between the apparatus and the one or more candidate nodes, the preconfigured beam information based on the one or more measurements carried out by the apparatus; and when the apparatus initiates a connection with a candidate node of the one or more candidate nodes, using the preconfigured beam information for at least initial communication with the candidate node.

According to a seventh aspect there is provided a non-transitory computer readable medium comprising program instructions for causing an apparatus to perform at least the following: communicating, by the apparatus, with a serving node in a wireless communication system; performing one or more measurements with one or more candidate nodes; storing preconfigured beam information for communication between the apparatus and the one or more candidate nodes, the preconfigured beam information based on the one or more measurements carried out by the apparatus; and when the apparatus initiates a connection with a candidate node of the one or more candidate nodes, using the preconfigured beam information for at least initial communication with the candidate node.

According to an eighth aspect there is provided a non-transitory computer readable medium comprising program instructions stored thereon for performing at least the following: communicating, by the apparatus, with a serving node in a wireless communication system; performing one or more measurements with one or more candidate nodes; storing preconfigured beam information for communication between the apparatus and the one or more candidate nodes, the preconfigured beam information based on the one or more measurements carried out by the apparatus; and when the apparatus initiates a connection with a candidate node of the one or more candidate nodes, using the preconfigured beam information for at least initial communication with the candidate node.

BRIEF DESCRIPTION OF FIGURES

The invention will now be described in further detail, by way of example only, with reference to the following examples and accompanying drawings, in which.

DETAILED DESCRIPTION

The present disclosure relates to 5G New Radio (NR) design. More particularly the present disclosure relates to self-organizing-network (SON) and integrated access and backhaul (IAB) nodes (also known as relay nodes). More particularly the present disclosure relates to self-configuration of such relay nodes or user equipment. More particularly the present disclosure relates to self-configuration of beam forming information.

The 5G NR shall be able to allow network deployment with minimized manual effort, and with as automated self-configuration as possible. Especially on higher frequency bands, coverage may be an issue. Specific capabilities are needed for NR to enable easy coverage extension with minimized/no requirement for network (re-) planning in a fast and cost-efficient manner. Mainly for these reasons NR has a requirement to support wireless backhaul to connect relay nodes (also called Integrated Access and Backhaul (IAB) nodes) with each other, and to base stations with fixed connection. More specifically, NR needs to support self-backhauling where a same carrier is used for backhaul connection as well as for the access links, i.e. enabling in-band backhaul operation. More generally, "backhaul" may be considered the ability of a system to connect an end user with one or more network nodes.

3GPP TSG-SA1 has defined general requirements for wireless self-backhauling in TS 22.261, Service requirement for the 5G System, section 6.12.2, and a RAN study item has been agreed for NR self-backhauling to be started in January 2018, (RP-170831). According to these requirements, a specific relaying node (RN) will have a wireless backhaul connection (instead of having a wired connection) to a "Donor" gNB (DgNB). The Donor gNB is a base station with fixed connection to the network backhaul. The serving DgNBs will have overall control of the usage of the radio resources considering both access and backhaul links.

Figure 1:
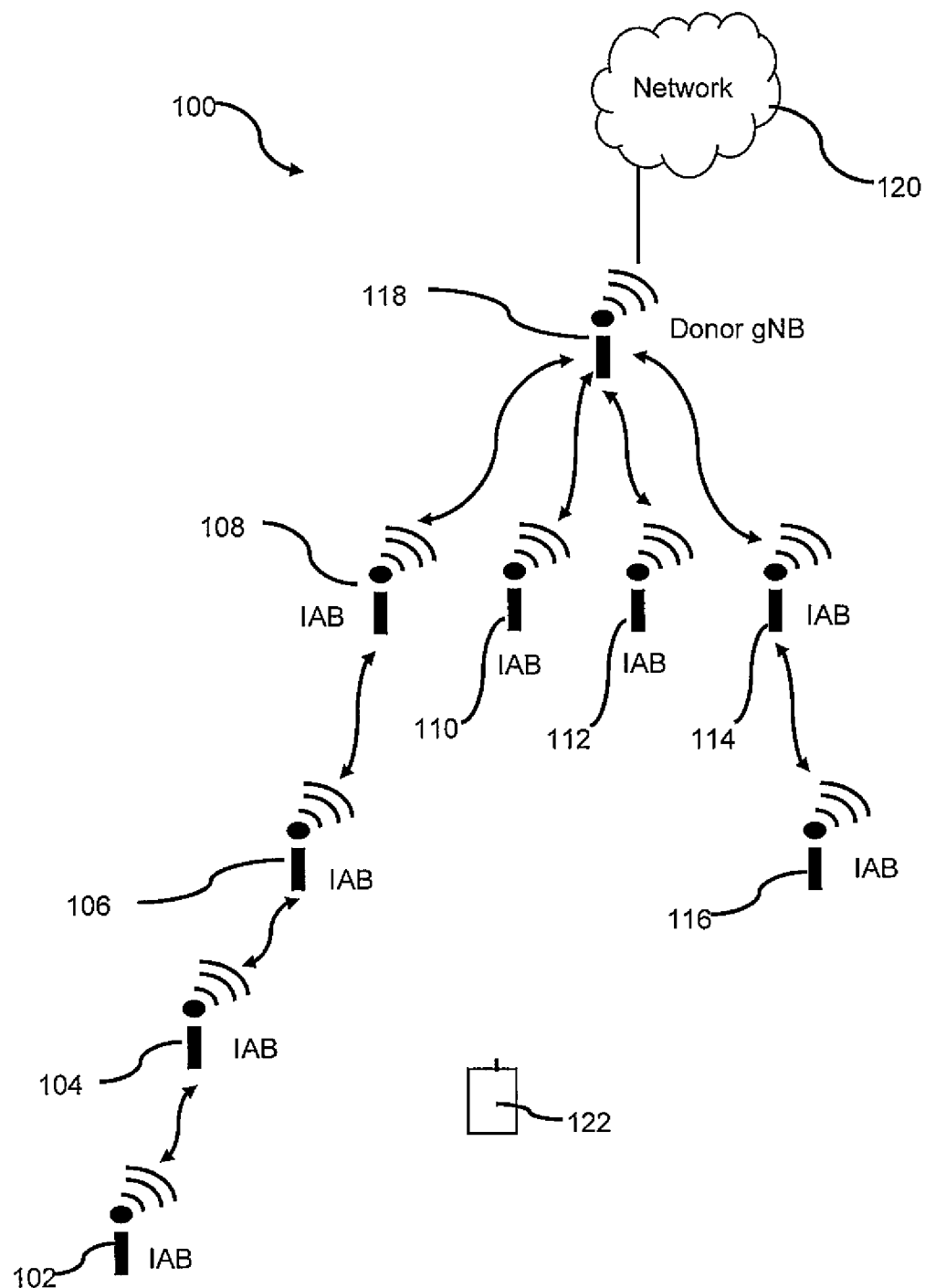
FIG. 1 shows a schematic example of certain parts of a wireless communication system where the invention may be implemented.

FIG. 1 schematically shows the relationship between Integrated Access and Backhaul (IAB) nodes, a Donor gNB (DgNB) and the wider network. The donor gNB may itself be considered an IAB, in some examples. In more detail, a simplified version of some aspects of a 5G network are shown at 100. The system comprises IAB nodes 102, 104, 106, 108, 110, 112, 114 and 116. These IABs may be considered part of an IAB "tree". A base station or gNB (or donor gNB) is shown at 118, at the top of the tree. Base station 118 is in communication with wider network 120. In some examples, IABs higher up the tree are considered as "parent" IABs to one or more IABs lower down the tree (the lower IAB being considered a "child" IAB). For example donor gNB 118 may be considered a parent node (or parent IAB) to child IABs 102 to 116. An IAB may also act as both a parent IAB (i.e. a parent to an IAB lower down the tree), and as a child IAB (i.e. child to an IAB higher up the tree). The IABs 102 to 116 and gNB 118 may be considered part of the backhaul network, enabling a user device schematically shown at 122 to communicate with the wider network 120 via the backhaul network.

Thus an IAB node may be considered to represent a co-located resource providing NR access coverage and backhauling over the air interface. As such, an IAB node may take on both the role or "personality" of a UE for the transferring of backhaul traffic, or that of a gNB (or gNB-DU (distributed unit)), serving connected UEs and forwarding backhaul traffic to the next hop. It will therefore be understood that in parts of the description the terms "UE" and "IAB" may be used interchangeably. In particular, the term "UE" may be interchangeable with "IAB (UE part)".

Like a wired node, an IAB node may serve one or more cells in a sectorized site, for example with 3 sectors per site for a hexagonal layout, and 4 cells per site for an urban grid. Each cell (sector) may be configured independently, being used for access or backhaul in concurrent slots. In some examples traffic may be forwarded internally within an IAB node, being received in one cell and transmitted in another cell on a subsequent slot.

In a typical IAB deployment, IAB nodes are stationary, i.e., not moving. However, there may be need for beam/route/topology changes in the IAB tree, for example due to mmWave blockage.

In mmWave communication narrow high gain beams may be used for communication between nodes, and due to the beam based communication the link between nodes may become blocked, or signal quality may degrade due to sudden changes in radio environment e.g. due to obstacles/physical objects. Such examples may generally be referred to as "blockage".

In the present disclosure, beam management enhancements for IAB nodes may be considered, for example in a case where an IAB node backhaul parent node is changed.

Given that the IAB node can take on the role or personality of a UE, it will be understood that the functionality of an IAB node described herein can be equally applied to a UE. An IAB node or a UE may generally be referred to as an apparatus.

Figure 2:
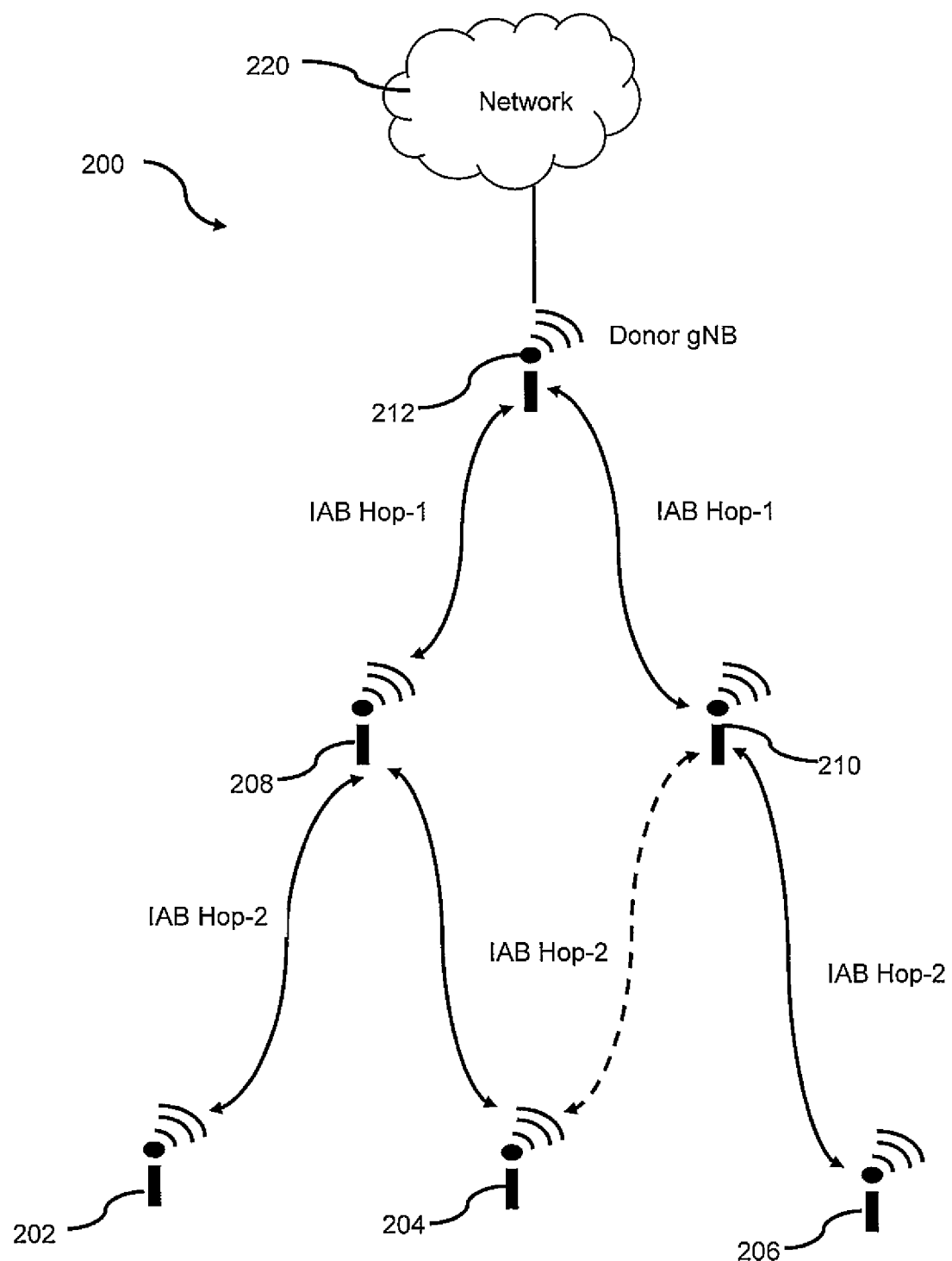
FIG. 2 shows a schematic example of certain parts of a wireless communication system where the invention may be implemented.

FIG. 2 illustrates IAB multi-hop architecture in a system 200. IABs are shown at 202, 204, 206, 208 and 210. A gNB or Donor-gNB (which may be a donor-gNB-DU) is shown at 212, and the wider network is schematically shown at 220. For example IABs 208 and 210 are one hop from donor gNB 212, and IABs 202, 204 and 206 are two hops from gNB 212. Furthermore, FIG. 2 shows how the parent-child relationships of IABs may change. For example, child IAB 204 may initially have IAB 210 as a serving parent IAB, and IAB 208 as a candidate parent IAB. Child IAB may then break its connection with (original) serving parent IAB 210 (as represented by the dashed arrow), and switch to candidate parent IAB 208 to become the new parent IAB.

For aiding understanding, the TCI (Transmission Configuration Indication) Framework of NR will be briefly explained.

In downlink (DL) a so-called TCI framework is defined to provide information about transmission (TX) beams to be used, e.g. by UEs (and/or IAB nodes implementing UE functionality). UEs may correspondingly use this information to assist the UE to set its receive beam properly when receiving the downlink transmission. For example a UE may be configured with one or multiple TCI states, where each TCI state at above 6 GHz has an associated reference signal which provides quasi co-location (QCL) type-D parameter. QCL type-D is defined to provide spatial domain characteristics of the reference signal (RS) i.e. UE is able to determine RX assumptions (such as RX beam direction) of a reference signal based on another signal based on the indicated QCL assumption. The associated reference signal can be synchronization signal/physical broadcast channel (SS/PBCH or SSB) block or channel state information reference signal (CSI-RS). For physical downlink control channel (PDCCH), the UE can have one active TCI state per control resource set (CORESET) (UE can be configured up to 3 CORESETs), and for physical downlink shared channel (PDSCH) the UE may have up to 8 active TCI states representing 8 candidate beams. From the 8 candidate beams the gNB can select one candidate beam dynamically via downlink control information (DCI) for the scheduled DL transmission. Different TCI states may represent TX beams of different Tx/Rx points (TRPs) of the cell.

In summary, following QCL types are defined:
QCL types A: Doppler shift, Doppler spread, average delay, delay spread
QCL types B: Doppler shift, Doppler spread
QCL types C: average delay, Doppler shift
QCL types D: Spatial Rx.

As an example, a TCI Table configuration for a target RS e.g. PDCCH DMRS (demodulation reference signal) or PDSCH DMRS is provided in Table 1 below. Table 1 may be considered to comprise beam information.

TABLE 1

| TCI index | Source RS/RS set index | QCL type |
|---|---|---|
| 0 | SS/PBCH block #n | A + D |
| 1 | TRS#b | A |
|   | CSI-RS#c | D |
| ... | ... | ... |
| M − 1 | CSI-RS#b | A + D |

Figure 3A:
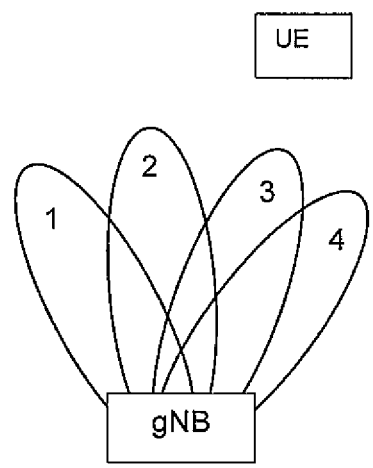
FIGS. 3A to 3C show schematic examples of beam forming.
Figure 3B:
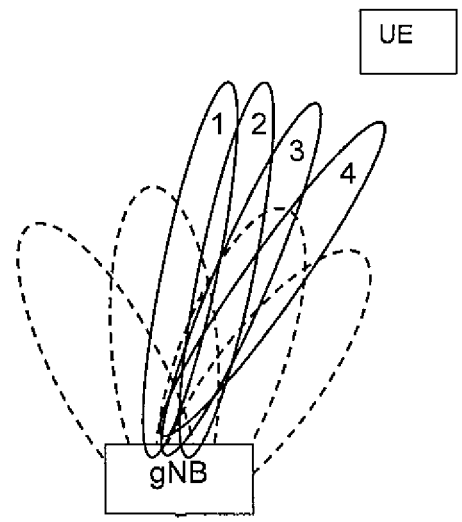
Figure 3C:
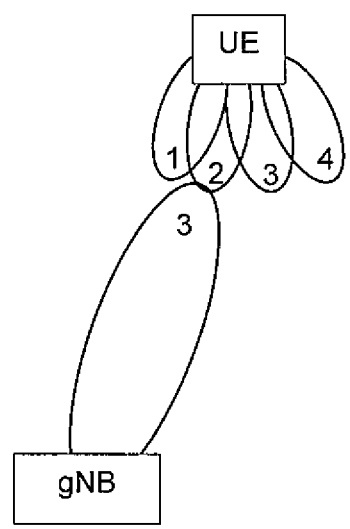

For the purposes of further explanation, beam management will now also be discussed in relation to FIGS. 3A to 3C.

5G NR comprises a set of procedures to refine gNB and UE side beams (and/or IAB side beams). Both DL and UL RSs can be used to refine the beam at both ends. For instance, in refining gNB beams, when based on DL RS, the gNB may transmit multiple CSI-RSs corresponding to different TX beams while UE uses a fixed RX beam and indicates the best TX beam. This is shown schematically in FIGS. 3A and 3B for example, which schematically show a gNB and a UE, the beams being schematically represented by the numbered ovals.

FIG. 3A may be considered to show initial gNB beam acquisition (e.g. SSB or CSI-RS), and FIG. 3B may be considered to show gNB beam refinement (e.g. CSI-RS).

In refining the UE beams the gNB may transmit multiple CSI-RSs using the same Tx, while the UE tries different Rx beams to find out the best one for the given Tx beam. This is schematically shown in FIG. 3C. Therefore FIG. 3C may be considered to show UE beam refinement.

In FIGS. 3A to 3C the functionality of the UE may be interchangeable with an IAB.

In a beam based operation, and especially in higher frequencies, there is a problem that the communication link quality may be subject to sudden degradation e.g. due to a change in radio environment such as blockage or interference. To tackle the problem of sudden changes of radio link quality/link failure, typically alternative routes or connections may be used (e.g. alternative TRP or a cell or a node), as these may be available by network deployment.

The present disclosure considers a problem of fast link re-establishment/recovery due to blockage, or due to scheduled/configured link switch by a child node to an alternative parent node. One potential scenario is the IAB scenario (where the nodes have low or no mobility); however, a similar problem may occur to access links as well (i.e. between UE and IAB node).

In more detail, the present disclosure addresses a problem of performance when a connection between a child IAB node and its parent IAB node becomes blocked for some reason. Currently, a handover is performed from the serving parent IAB node without knowledge of the optimum beam at the target parent IAB node. Instead, a wide cell is assumed at the target parent IAB node and only after/during handover may the beam refinement procedure be started and the optimum beam be found. As will be discussed in more detail below, in examples a beam refinement procedure is performed in a pre-emptive manner between a child IAB node and a candidate parent IAB node, prior to when a connection is blocked between the child IAB node and its parent IAB node. Thus when the blockage occurs, the child IAB has a refined beam procedure in place with a candidate (or target)

parent IAB. Or in other words, the child IAB node knows the optimum beam at the target parent IAB node prior to handover. According to examples the obtaining of beam information necessary to perform the method is carried out without a need for drive-testing.

According to an example, preconfigured beam information (e.g. preconfigured TCI table) is used that may be accessed after initial access to a new parent. A default TCI state may also be selected based on the initial access.

According to an example, the TCI table may be preconfigured at initial setup of an IAB node.

For example the TCI table may be preconfigured by configuring an IAB node with CSI-RS (or SSB) measurements for neighboring parent nodes in addition to the serving parent node, and based on those measurements the TCI table can be configured for the neighboring parent-node(s). In one example, a contention-free random access (CFRA) preamble may be configured for a preconfigured node/cell, which CFRA preamble serves as a trigger to activate the preconfigured TCI table. In some examples the CFRA signal may be configured for default (e.g. pre-activated) TCI state, which may be defined by the parent node. In some examples the child node prioritizes the default state when accessing a new parent.

In some examples, a child IAB node (e.g. UE part) may make "tentative" connections to neighboring parent nodes, and then normal beam refinement procedure could be applied.

In one example in the tentative connection to a parent node (e.g. target parent node), a child IAB node would associate/connect with/to the parent for performing at least one of:
  receiving reference signal configuration, measurement configuration and reporting configuration and configuration for updating the (preconfigured) TCI table;
  receiving configuration for the (preconfigured) TCI table association between the parent and child node, performing beam refinement/training (to determine e.g. CSI-RS beams/SSB beams) to populate TCI table and receive configuration for the TCI table entries;
  receive optional activation command (MAC CE) of a specific TCI state PDCCH or PDSCH which could be used by default when UE or IAB UE part (fully) connects;
  performing an update of the TCI table by measurements, reporting and receiving updated configuration (via RRC or MAC).

In some examples, when UE (or IAB UE part) has a tentative connection but is not "fully" connected, the tentative connection is not used for data communication i.e. UE is not actively scheduled for data transmission/reception by the tentative/candidate node. Accordingly, in some examples the tentative connection may be considered to have less functionality than a full connection. Accordingly in some examples, the tentative connection is not configured for data transmission and reception. In some examples, when fully connected the IAB node is connected for data transmission and reception. The tentative connection may be maintained by periodical updates of the preconfigured TCI table. In tentative connection, UE may still be configured to receive updates on measurements configuration and/or TCI table. In one example, when UE is connected (or fully connected) to multiple parent IAB nodes, it may be done using dual-connectivity or multi-connectivity. In alternative example, the network (parent IAB node) may provide UE or IAB a specific TCI table with set of entries (TCI states) without measurements e.g. based on a prior information i.e. if the network determines TCI entry based on history or some other knowledge about the network such as beam configuration. In dual-connectivity, UE or child IAB node is scheduled/communication occurs with both serving IAB nodes. The tentative connections could be still made with IAB nodes that the child IAB node is not connected to for dual or multi-connectivity communication. The making of these tentative connections may comprise beam training (e.g. beam refinement). The network would then provide the child IAB node (e.g. UE part) with a TCI table which the child IAB node (e.g. UE part) would store for future use. In some examples the child IAB node TCI table is populated with entries by the parent IAB node (or in more general view by network), for example using beam information obtained from measurements and reporting. In some examples this table is specific to each of the tentative connections. An aim of the beam training is to determine a set of beams that can be used for communication i.e. SSB and/or CSI-RS based beams. One of the benefits is that performing beam training prior to the full connection (i.e. when a child IAB is still connected to another parent) allows the potential use of narrow/high gain CSI-RS beams for communication in quick manner when (full) connection is made (i.e. due to HO command or recovery by LAB child) to the tentative/candidate IAB parent. Thus the methods may also be applied to non-IAB scenarios i.e. in normal UE to NW connections or access link. That is pre-configuration, which may include beam training, may be performed during IAB set-up phase to new IAB node (parent), and also to neighbor (parent) nodes. In such examples:
  weak candidate parent nodes may be excluded based on signal level
  when a new candidate parent is detected, a TCI pre-configuration may be triggered toward the new node
  a child node may be limited to a maximum number of pre-configured TCI tables (i.e. parent links).

To determine the potential candidate nodes to establish a tentative connection, following example methods may be used by child IAB node (UE or UE part):
  UE either scans (tries to detect based on CSI-RS or SSB measurements) for other IABs candidates and determines which ones to establish the pre-configuration/tentative connection (e.g. based on signal quality)
  Changing the serving node to another serving node can trigger the scan for candidates
  UE may also scan periodically for candidates
  One option is that serving node gives UE the exclusive list of candidates to be scanned, or a list with potential candidates (i.e. neighbours)
  When specific node is a serving node, then UE would select based on predefined set the candidate IAB nodes (this may be determined and indicated by network)

Therefore in some examples a child IAB uses a tentative connection with a candidate parent node in order to obtain preconfigured beam information therewith. When the child IAB later initiates a (full) connection with the candidate parent node, the child IAB uses the preconfigured beam information for at least initial beam formation with the candidate parent node (which then becomes the serving parent node).

Thus it will be understood that the pre-configured TCI table may be prepared in more than one way, e.g. utilizing a supplied TCI table, or building the table based on information obtained from tentative connections.

Reference is made above to IAB "UE part". In some examples an IAB node may implement both UE and gNB functionality. The UE part (e.g. child IAB node) accesses the parent IAB node (which provides the gNB functionality) as if it were a "normal" UE. In a similar manner an IAB node that is a child to one IAB node may act as a parent node to another IAB node.

In an example, a validity of the preconfigured TCI table (and/or of certain information in the table) may be indicated by the child node to the parent node when performing initial access (or beam/radio link failure recovery or preconfigured link switch), by transmitting an UL preamble that corresponds to one of the TCI entries in the table. "Validity" may refer to, for example, all the TCI states, subset of TCI states or at least one TCI state in the pre-configured TCI table based on signal quality e.g. comparing it to pre-defined/configured threshold, the state being valid if it meets that threshold. Signal quality metric for determining the validity may be e.g. RSRP, RSRQ, L1-RSRP, SINR, L1-SINR, BLER or the like.

In one example, a validity of the preconfigured TCI states may be explicitly signalled using msg.3 (of CBRA or CFRA on provided UL grant). The validity indication may comprise a bitmap corresponding to the TCI table entries for PDCCH (and/or PDSCH). Validity may comprise a signal quality level as described previously.

In one example the preconfigured TCI table can contain L3 mobility CSI-RS of the IAB node (CSI-RS for mobility or CSI-RS for L3 mobility).

After initial access of the child node to the new parent node, the preconfigured TCI table may be activated. That is the child and new parent node may begin communicating according to the TCI table.

According to some examples a TCI table ID is associated per link (child-parent IAB). In some examples an IAB node (be it a child or parent) may store two or more TCI tables, and may use a different TCI table for different child-parent links. Alternatively a same TCI table may be used for two or more different child-parent links. Regardless of how many child-parent links are present and how many TCI tables are used to support those links, it will be understood that in some examples a TCI table has or assumes a different ID for each link. Or in other terms the pre-configured TCI table or tables may be child-parent link specific and may be referred using an identifier.

According to some examples, stored preconfigured beam information may be periodically updated. For example a stored TCI table may be periodically renewed or trained. Such renewal or training may be more generically referred to as updating. Such updating may be carried out for each parent node. For example consider a child node which has a child-parent relationship with a first parent node and a second node. Periodically the table may be renewed in the child IAB node or trained for its relationship with the first parent node, and another (or indeed the same) of renewed or trained for its relationship with the second parent node.

According to some examples the validity of a preconfigured table may be controlled by a timer. In some examples, upon expiry of the timer a child requests a new table or begins updating the table.

In some examples, if a child node does not request periodical training from the parent node, the parent node may delete the pre-configuration of the TCI table for the specific child node. That is, the parent node may assume that the child node no longer requires the connection. This prevents unnecessary connections from remaining in place.

In some examples the preconfigured beam information (e.g. TCI table) is stored at a child IAB node. In some examples the preconfigured beam information is stored at the parent node. In some examples the preconfigured beam information is stored at the child node and the parent node.

According to some examples, a schedule is provided for the periodic table updates. For example the schedule can be configured with a certain time window and periodicity e.g. the time window is X ms, every Y ms. This allows an approach where a node may have other traffic to transmit/perform other tasks. Alternatively such occasions may be preconfigured for each link. In a similar manner, in some examples a child node may expect the TCI table update to occur within a time window. In some examples the periodic table updates are configured to take place during non-busy periods e.g. when there is low traffic.

According to some examples, the table update may be trigger based. For example the update may occur when the child node changes measurement configuration e.g. RX spatial filter parameters used for measurements. According to some examples a trigger may be requested by a child upon a change of parameters (aperiodic update). According to some examples a trigger may also be sent by a parent node to a child node, for example when the parent node changes beam configuration or TX related parameters (antenna pattern) when a child has already established an association with the parent.

In some examples, by default, the child node performs initial access to a parent node according to one of the preconfigured TCI states in the table, in order to indicate the validity of the table to the parent node. The child node may do so using CFRA (contention free random access) signals if configured, or use CBRA (contention based random access). This implicitly indicates the validity of the TCI table to the parent, and activates the indicated TCI state for PDCCH/PDSCH (also for PUCCH/PUSCH transmission). In some cases, the child node may have an SR (scheduling request) signal configured for connecting/indicating an update request or request for activating the pre-configured connection to the IAB parent. If a child node ID is known (for example parent node identifies based on dedicated signal, or through random access procedure in general) and initial access indicates a DL RS (CSI-RS/SSB) not in the preconfigured TCI table, the TCI table may be "flushed" (e.g. one or more entries deleted), and the table reconfigured.

According to an example, a parent node can trigger aperiodic CSI measurements on the potential links in the table, when child IAB connects and indicates validity of the table. This may enable speeding up of the initial beam refinement procedure, especially in failure cases where UE/Network node connects to another node/cell upon link failure. Such aperiodic CSI measurements may be most suitable for stationary links, but could work also in low mobility cases when the need for updating the TCI table arises (thus the method could work for IAB scenario as well as normal access scenario UE-BS).

Figure 4:
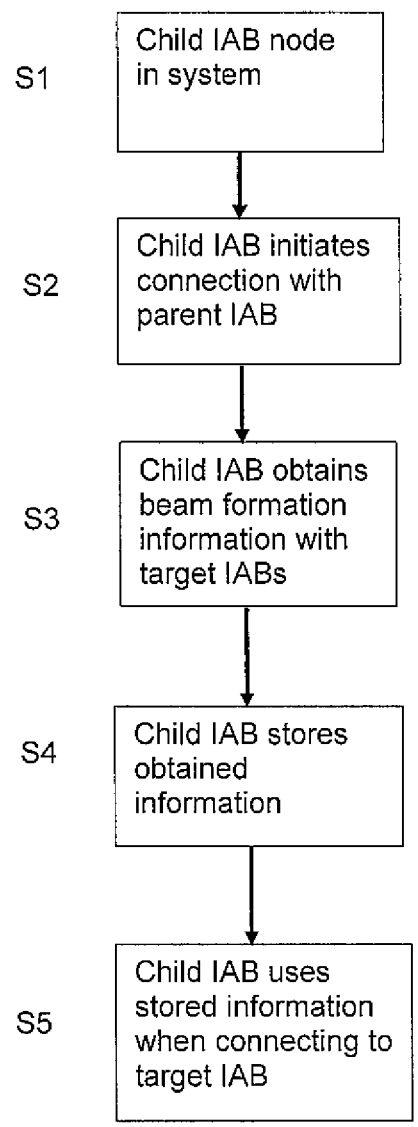
FIG. 4 schematically shows a flow chart of a method according to an example.

An example method will now be described with respect to FIG. 4.

A child IAB node (apparatus) is present in a system, as shown at S1.

At S2, the child IAB node initiates a connection with a parent IAB node. The child IAB node may then be configured for communicating with the (serving) IAB node with which it has initiated the connection.

As shown at S3, while initiating and/or forming the connection with the parent IAB node, the child IAB node obtains information for beam formation with one or more target IAB nodes. During this period the child IAB node may also be obtaining information for beam formation with the serving parent IAB node. The IAB node may obtain the beam information in one or more ways. For example the child IAB node may obtain the information based on measurement of reference signals received from the target IAB nodes. Additionally or alternatively the child IAB node may obtain the beam information based on information obtained using tentative connections formed with the target IAB nodes. Generally speaking, the preconfigured beam information is obtained by the apparatus performing one or more measurements with the one or more candidate nodes.

As shown at S4, the child IAB node stores the obtained beam information. The stored beam information may be considered preconfigured beam information. The beam information may be stored in the form of a table or list or information element. For example the information may be stored in the form of a TCI table or a TCI list. The TCI table may have been constructed at the network (e.g. parent IAB node), and sent to the child IAB node.

In some examples, S3 and S4 may be combined rather than considered as separate steps. For example, the TCI table (or framework of the TCI table) may be stored at the child IAB node (and/or the parent IAB node), and the table then populated with the beam information as the measurements are taking place. For example the table entries may comprise the TCI states (e.g. downlink reference signals CSI-RS/SSB), or beams that are identified by the said reference signals. In some examples the child IAB (e.g. UE part) measures reference signals of the target IAB nodes, and the child IAB node (e.g. UE part) and/or parent IAB node then configures or constructs the TCI table based on the measurements that have been taken.

Typically the table is populated/configured after initial access, and this configuration takes time due to measurement configuration and reporting, and TCI entry configuration.

In some examples, the network may also provide the child IAB node (e.g. IAB UE part) with a TCI table based on existing knowledge of the network.

At S5, the connection between the child IAB node and the serving parent IAB node becomes blocked. Accordingly the child IAB node forms a connection with one of the target IAB nodes instead, using the stored preconfigured beam information. This speeds up the process of obtaining refined beam formation between a child IAB and a new serving parent IAB node.

Figure 5:
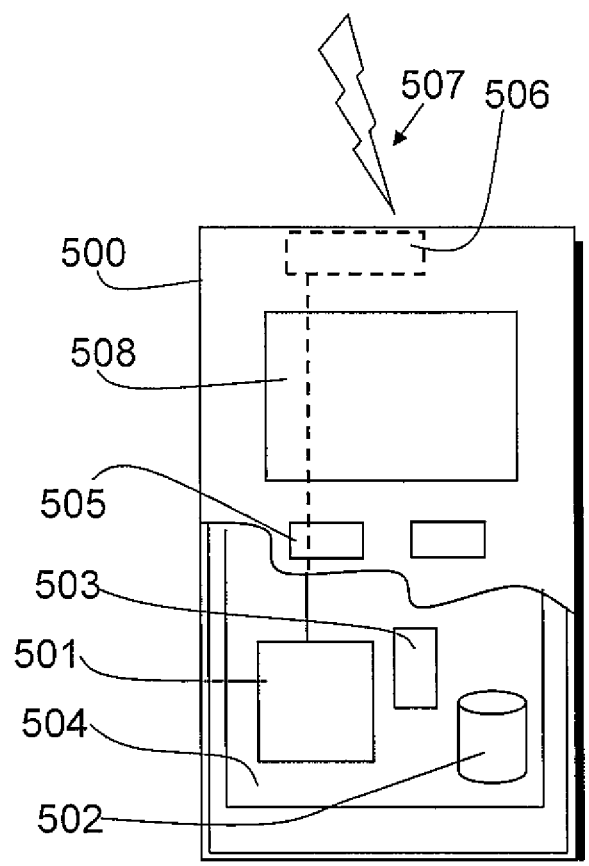
FIG. 5 schematically shows parts of a user equipment, according to an example.

A possible wireless communication device will now be described in more detail with reference to FIG. 5 showing a schematic, partially sectioned view of a communication device 500. Such a communication device is often referred to as user equipment (UE) or terminal. An appropriate mobile communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

A wireless communication device may be for example a mobile device, that is, a device not fixed to a particular location, or it may be a stationary device. The wireless device may need human interaction for communication, or may not need human interaction for communication. In the present teachings the terms UE or "user" are used to refer to any type of wireless communication device.

The wireless device 500 may receive signals over an air or radio interface 507 via appropriate apparatus for receiving and may transmit signals via appropriate apparatus for transmitting radio signals. In FIG. 5 transceiver apparatus is designated schematically by block 506. The transceiver apparatus 506 may be provided for example by means of a radio part and associated antenna arrangement. The antenna arrangement may be arranged internally or externally to the wireless device.

A wireless device is typically provided with at least one data processing entity 501, at least one memory 502 and other possible components 503 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 504. The user may control the operation of the wireless device by means of a suitable user interface such as key pad 505, voice commands, touch sensitive screen or pad, combinations thereof or the like. A display 508, a speaker and a microphone can be also provided. Furthermore, a wireless communication device may comprise appropriate connectors (either wired or wireless) to other devices and/or for connecting external accessories, for example hands-free equipment, thereto. The communication devices 502, 504, 505 may access the communication system based on various access techniques.

Figure 6:
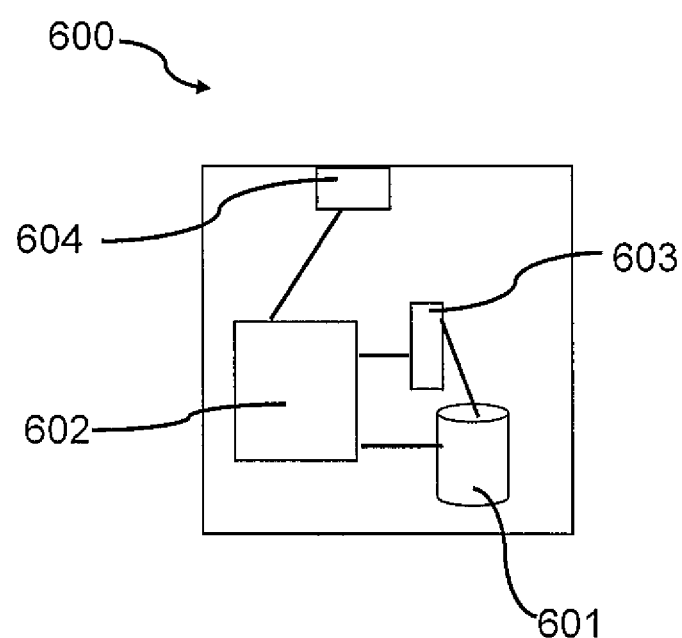
FIG. 6 schematically shows parts of a control apparatus, according to an example.

FIG. 6 shows an example of a control apparatus for a communication system, for example to be coupled to and/or for controlling a station of an access system, such as a RAN node, e.g. a base station, gNB, a central unit of a cloud architecture or a node of a core network such as an MME or S-GW, a scheduling entity such as a spectrum management entity, or a server or host, or an IAB or relay node. The control apparatus may be integrated with or external to a node or module of a core network or RAN. In some embodiments, base stations comprise a separate control apparatus unit or module. In other embodiments, the control apparatus can be another network element such as a radio network controller or a spectrum controller. In some embodiments, each base station may have such a control apparatus as well as a control apparatus being provided in a radio network controller. The control apparatus 600 can be arranged to provide control on communications in the service area of the system. The control apparatus 600 comprises at least one memory 601, at least one data processing unit 602, 603 and an input/output interface 604. Via the interface the control apparatus can be coupled to a receiver and a transmitter of the base station. The receiver and/or the transmitter may be implemented as a radio front end or a remote radio head. For example the control apparatus 600 or processor 601 can be configured to execute an appropriate software code to provide the control functions.

Figure 7:
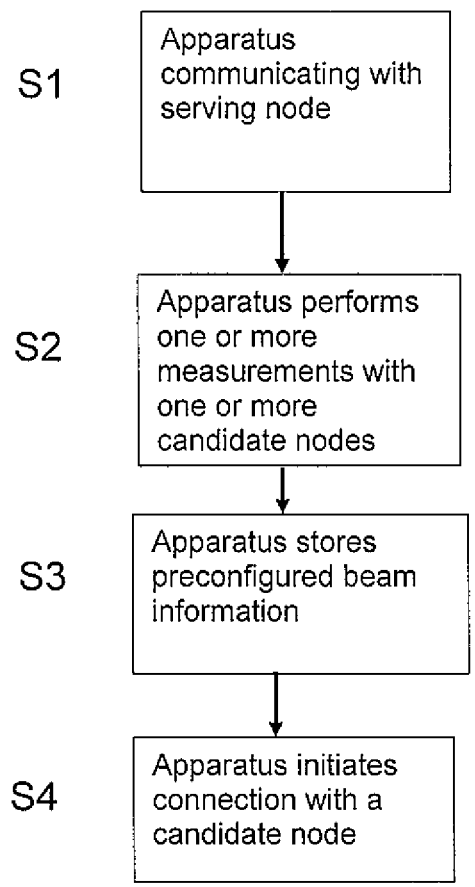
FIG. 7 schematically shows a flow chart of a method according to an example.

FIG. 7 is a flow chart of a method according to an example. The flow chart of FIG. 7 is viewed from the perspective of an apparatus such as a UE or IAB node (e.g. UE part).

At S1, the apparatus is communicating with a serving node. The serving node may be in a wireless communication system.

At S2, the apparatus performs one or more measurements with one or more candidate nodes.

At S3, the apparatus stores preconfigured beam information for communication between the apparatus and the one or more candidate nodes, the preconfigured beam information based on the one or more measurements carried out by the apparatus.

At S4 the apparatus initiates a connection with a candidate node of the one or more candidate nodes, using the preconfigured beam information for at least initial communication with the candidate node.

It will be understood that the described steps of the method are not necessarily purely sequential, according to some examples. For example, in terms of timings there may be overlap between S1 to S3.

Figure 8:
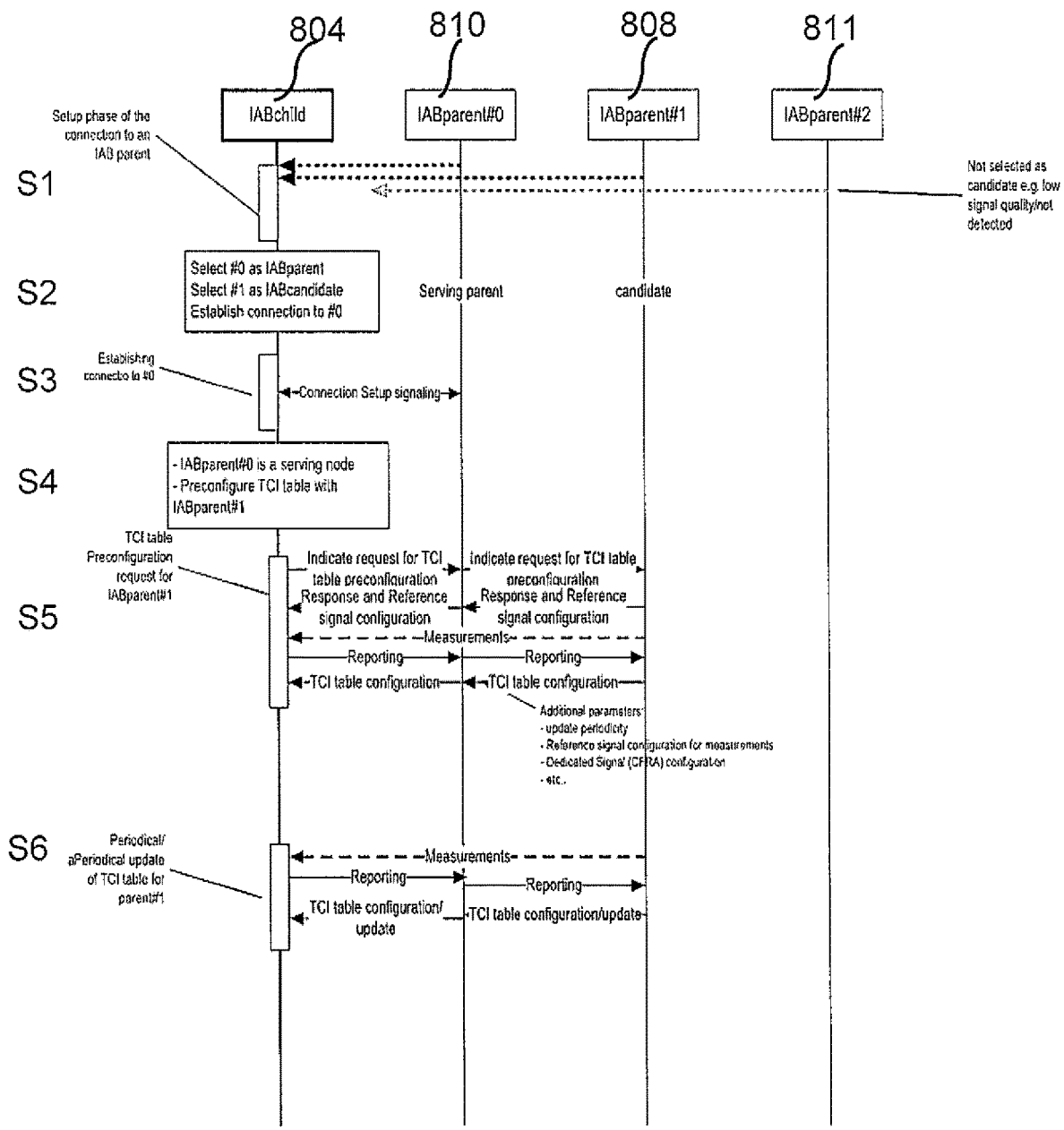
FIG. 8 schematically shows a signalling diagram of a method according to an example.

FIG. 8 schematically shows a signalling diagram of a method according to an example. More particularly FIG. 8 shows signalling between a child IAB 804, a serving parent IAB 810, a candidate IAB node 810, and a further candidate IAB node 811.

S1 shows a set-up phase for the child IAB 804. During this period, the child IAB 804 is receiving signals (e.g. reference signals) from the IABs 810, 808, 811 (at S1 these may all be considered candidate parent IABs).

At S2 the child IAB 804 selects IAB node 810 to be the serving parent IAB node, and IAB node 808 to be a candidate IAB node. In this example IAB node 811 is not selected as a candidate e.g. because of low signal strength of signals received at S1.

At S3, child IAB 804 performs connection set-up signalling with serving parent IAB 810.

Therefore as shown at S4, IAB 810 is the serving parent node. Also shown at S4, the child IAB 804 may begin preconfiguring the TCI table with candidate IAB 808, in the manners described in detail above.

This is explained in more detail at S5. At this stage, IAB 804 indicates a request for TCI table preconfiguration to IAB 810. This request may be signalled, for instance with RRC signalling. This indication is then forwarded from IAB 810 to IAB 808. The IAB 808 responds with a response and reference signal configuration. In this example the response and reference signal configuration is sent from IAB 808 to IAB 804 via IAB 810. Measurements are then performed by IAB node 804 from reference signals sent by IAB 808. Following this, IAB 804 reports the measurements back to IAB 808, via serving IAB 810. The IAB 808 then provides TCI table configuration information (beam information) to child IAB 804, sent via serving IAB 810. The TCI table configuration information may additionally include information such as one or more of: update periodicity; reference signal configuration for measurements; dedicated signal (CFRA) configuration. Child IAB 804 then has the beam information it requires for communication with candidate IAB node.

As shown at S6, periodical updates of the TCI table may occur at IAB 804 and/or IAB 808. During this stage, reference signals may be received at IAB 804 from IAB 808. The child IAB node 804 may perform measurements on these reference signals. Using this information the IAB 804 may update the TCI table for the candidate IAB node 808.

The IAB 804 may then report the measurements back to IAB 808, via IAB 810. Serving IAB 808 may then update its TCI configuration table. Subsequent TCI table configuration updates may also be received at IABs 810 and 804 in due course.

In the example of FIG. 8, the child IAB 804 only communicates directly with its serving parent IAB 810, and the serving parent IAB 810 forwards the signalling to/from the candidate parent node 808. An advantage of this approach is that the child IAB 804 need not connect to more than one parent node.

Figure 9:
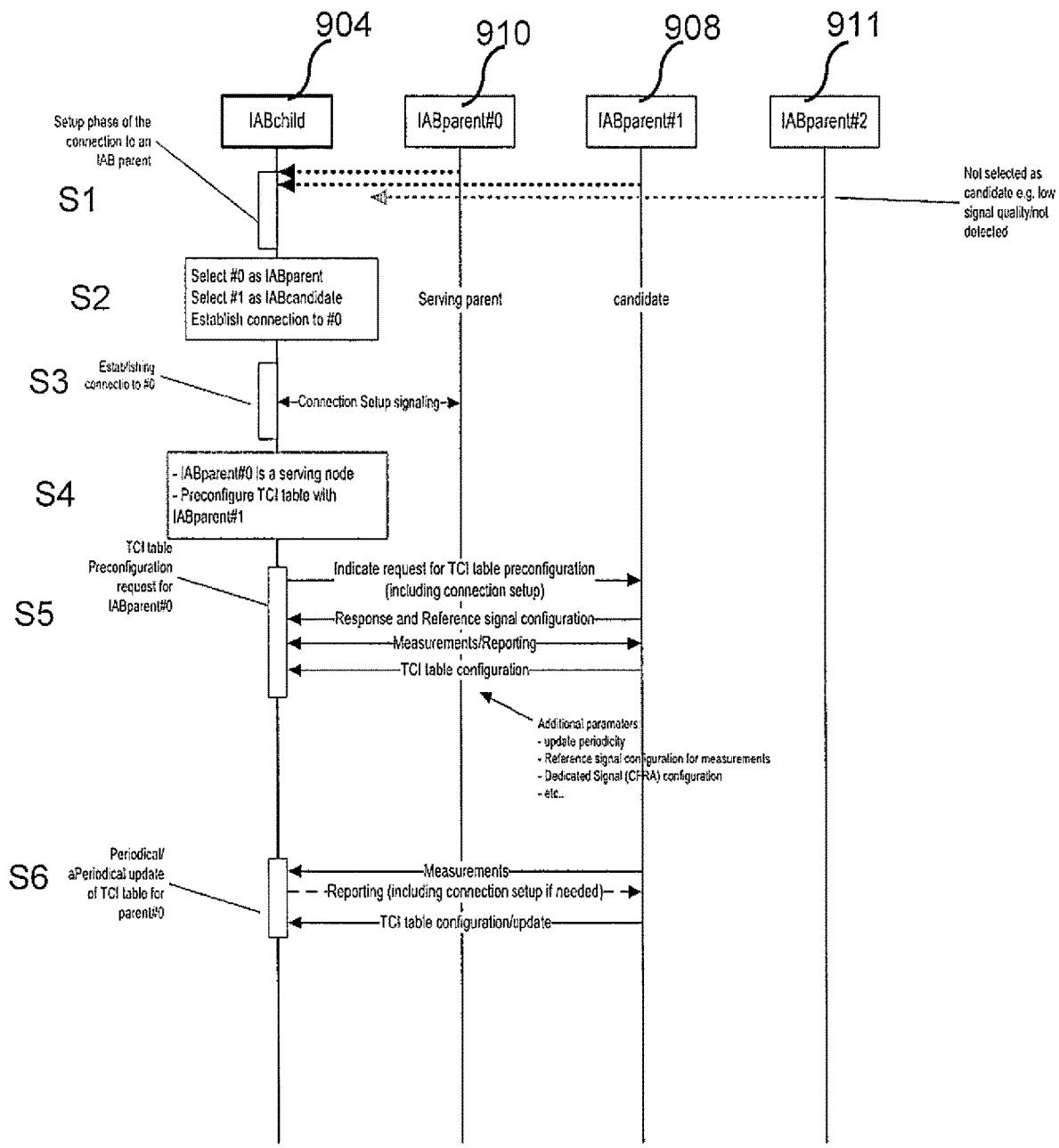
FIG. 9 schematically shows a signalling diagram of a method according to an example.

An alternative example is shown in the signalling diagram of FIG. 9. More particularly FIG. 9 shows signalling between a child IAB 904, a serving parent IAB 910, a candidate IAB node 908, and a further candidate IAB node 911.

S1 shows a set-up phase for the child IAB 904. During this period, the child IAB 904 is receiving signals (e.g. reference signals) from the IABs 910, 908, 911 (at S1 these may all be considered candidate parent IABs).

At S2 the child IAB 904 selects IAB 910 to be the serving parent IAB, and IAB 908 to be a candidate serving IAB. In this example IAB 911 is not selected as a candidate e.g. because of low signal strength of signals received at S1.

At S3, child IAB 904 performs connection set-up signalling with serving parent IAB 910.

Therefore as shown at S4, IAB 910 is the serving parent node. Also shown at S4, the child IAB 904 may begin preconfiguring the TCI table with candidate IAB 908, in the manners described in detail above.

This is explained in more detail at S5.

At S5, LAB 904 performs a connection setup to candidate IAB node 908 and indicates a request for TCI table preconfiguration to candidate IAB 908. This connection may be called a tentative connection, which is intended for some signalling but not intended for data transmission. Candidate IAB 908 sends a response and reference signal configuration message directly back to child IAB 904. Measurements/reporting may then occur directly between child IAB 904 and candidate IAB 908, i.e., the child IAB may perform measurements and may report the measurement results to the candidate IAB 908. The candidate IAB 908 may also send TCI table configuration information directly to child IAB 904. The configuration information may additionally include one or more of: update periodicity; reference signal configuration information for measurements; dedicated signal (CFRA) configuration. After the TCI table configuration has been received by the child IAB node, the (tentative) connection to the candidate IAB node may be released and normal data transmission may continue with the serving parent IAB node.

As shown at S6, IAB 904 may perform periodical or aperiodical updates of the TCI table stored at IAB 904. This may include receiving reference signals directly from IAB 908, performing measurements on those reference signals, reporting (including connection set up if needed) the measurement results directly to IAB 908, and receiving TCI table configuration/update information directly from IAB 908.

Therefore in the example of FIG. 9 the IAB child 904 directly connects to candidate parent node(s) to get the measurement configuration, to report the measurements and to receive the pre-configuration information. These connections to candidate parent nodes correspond to the "tentative" connections described in more detail above.

Therefore in some examples it will be understood that the child IAB node performs measurements (which may be configured measurements). Results of these measurements are reported to the network (e.g. serving or candidate parent IAB), and in response the beam information (e.g. TCI table and/or information from the table) is received from the network at the child IAB. Therefore in some examples it is the network (e.g. parent IAB) which constructs the TCI table based on measurement information received from the child IAB.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As used in this application, the term "circuitry" may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuits) and or processor(s), such as a microprocessor(s) or a portion of a microprocessor(s), that requires software (e.g., firmware) for operation, but the software may not be present when it is not needed for operation. This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The embodiments of this invention may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more embodiments with any of the other embodiments previously discussed.

The invention claimed is:

1. A child node comprising:
at least one processor; and
at least one memory including computer program code, the at least one memory and the computer program code configured, with the at least one processor, to cause the at least to perform:
communicating with a parent node in a wireless communication system;
performing one or more measurements with one or more candidate parent nodes to obtain preconfigured beam information;
storing the preconfigured beam information for communication between the child node and one or more candidate parent nodes; and
when the child node initiates a connection with a candidate parent node of the one or more candidate parent nodes for recovery purposes, using the preconfigured beam information for at least initial communication with the candidate parent node.

2. The child node according to claim 1, wherein the one or more measurements comprise measurements of reference signals obtained from the one or more candidate parent nodes.

3. The child node according to claim 1, wherein the at least one memory and the computer program code are further configured to perform:
reporting the one or more measurements to the parent node or to the one or more candidate parent nodes.

4. The child node according to claim 1, wherein the preconfigured beam information is obtained in response to reporting the measurements by the child node.

5. The child node according to claim 1, wherein the at least one memory and the computer program code are further configured to perform:
establishing one or more tentative connections with the one or more candidate parent nodes in order to obtain the preconfigured beam information.

6. The child node according to claim 5, wherein the at least one memory and the computer program code are further configured to perform beam training with the tentative connections.

7. The child node according to claim 1, wherein the at least one memory and the computer program code are further configured to perform periodical updates of the stored preconfigured beam information.

8. The child node according to claim 1, wherein the at least one memory and the computer program code are further configured to perform:
excluding a node as a potential candidate parent node based on measured signal level.

9. The child node according to claim 1, wherein the at least one memory and the computer program code are further configured to perform:
storing the preconfigured beam information in a table or list or information element.

10. The child node according to claim 9, wherein the at least one memory and the computer program code are further configured to perform:
indicating a validity of the stored preconfigured beam information by transmitting an uplink preamble that corresponds to an entry in the table or list or information element.

11. The child node according to claim 7, wherein the at least one memory and the computer program code are further configured to perform:
deleting the stored preconfigured beam information when it is determined that the child node has not performed updating of the stored preconfigured beam information for a predetermined period of time.

12. The child node according to claim 1, wherein the at least one memory and the computer program code are further configured to perform:
obtaining the preconfigured beam information without performing a drive test.

13. The child node according to claim 1, wherein the child node comprises an integrated access and backhaul node, or a user equipment.

14. The child node according to claim 1, wherein the at least one memory and the computer program code are further configured to perform:
initiating the connection with the candidate parent node in response to determining a blockage of the parent node.

15. A method comprising:
communicating, by a child node, with a parent node in a wireless communication system;
performing one or more measurements with one or more candidate parent nodes to obtain preconfigured beam information;
storing the preconfigured beam information for communication between the child node and the one or more candidate parent nodes, the preconfigured beam information being based on the one or more measurements carried out by the child node; and
when the child node initiates a connection with a candidate parent node of the one or more candidate parent nodes for recovery purposes, using the preconfigured beam information for at least initial communication with the candidate parent node.

16. The method according to claim 15, wherein the one or more measurements comprise measurements of reference signals obtained from the one or more candidate parent nodes.

17. The method according to claim 15, further comprising:
reporting the one or more measurements to the parent node or to the one or more candidate parent nodes.

18. The method according to claim 15, wherein the preconfigured beam information is obtained in response to reporting the measurements by the child node.

19. The method according to claim 15, further comprising:
establishing one or more tentative connections with the one or more candidate parent nodes in order to obtain the preconfigured beam information.

20. The method according to claim 19, further comprising:
performing beam training with the tentative connections.

21. The method according to claim 15, further comprising:
performing periodical updates of the stored preconfigured beam information.

22. The method according to claim 15, further comprising:
excluding a node as a potential candidate parent node based on measured signal level.

23. The method according to claim 15, further comprising:
storing the preconfigured beam information in a table or list or information element.

24. The method according to claim 23, further comprising:
indicating a validity of the stored preconfigured beam information by transmitting an uplink preamble that corresponds to an entry in the table or list or information element.

25. The method according to claim 21, further comprising:
deleting the stored preconfigured beam information when it is determined that the child node has not performed updating of the stored preconfigured beam information for a predetermined period of time.

26. The method according to claim 15, further comprising:
obtaining the preconfigured beam information without performing a drive test.

27. The method according to claim 15, wherein the child node comprises an integrated access and backhaul node, or a user equipment.

28. The method according to claim 15, further comprising:
initiating the connection with the candidate parent node in response to determining a blockage of the parent node.

29. A computer program product comprising a non-transitory computer-readable storage medium bearing computer program code embodied therein for use with a computer, the computer program code comprising code for performing at least the following:
communicating with a parent node in a wireless communication system;
performing one or more measurements with one or more candidate parent nodes to obtain preconfigured beam information;

storing the preconfigured beam information for communication between a child node and the one or more candidate parent nodes, the preconfigured beam information being based on the one or more measurements carried out by the child node; and when the child node initiates a connection with a candidate parent node of the one or more candidate parent nodes for recovery purposes, using the preconfigured beam information for at least initial communication with the candidate parent node.

* * * * *